United States Patent
Junior

(10) Patent No.: US 12,280,561 B2
(45) Date of Patent: Apr. 22, 2025

(54) PROCESS OF MANUFACTURE OF BASALTIC ANTIABRASIVE HYBRID PLATES

(71) Applicant: AB3 Administração e Projetos Ltda., Vitoria (BR)

(72) Inventor: Fernando Mainard Junior, Vila Velha (BR)

(73) Assignee: AB3 Administração e Projetos Ltda., Vitória (BR)

( * ) Notice: Subject to any disclaimer, the term of this patent is extended or adjusted under 35 U.S.C. 154(b) by 87 days.

(21) Appl. No.: 16/064,285

(22) PCT Filed: Dec. 19, 2016

(86) PCT No.: PCT/BR2016/000160
§ 371 (c)(1),
(2) Date: Jul. 21, 2022

(87) PCT Pub. No.: WO2017/100881
PCT Pub. Date: Jun. 22, 2017

(65) Prior Publication Data
US 2024/0227352 A1   Jul. 11, 2024

(30) Foreign Application Priority Data
Dec. 17, 2015 (BR) .......................... 1020150316470

(51) Int. Cl.
*B32B 13/06* (2006.01)
*B32B 7/12* (2006.01)
(Continued)

(52) U.S. Cl.
CPC ................ *B32B 13/06* (2013.01); *B32B 7/12* (2013.01); *B32B 15/02* (2013.01); *B32B 15/18* (2013.01);
(Continued)

(58) Field of Classification Search
CPC ........... B32B 7/12; B32B 13/06; B32B 15/02; B32B 15/18; B32B 2307/3065; B32B 2307/554; B32B 2307/714; E01C 5/22
(Continued)

(56) References Cited

U.S. PATENT DOCUMENTS 1,108,007 A * 8/1914 Ribbe ................. C04B 38/0615
264/44
3,345,734 A * 10/1967 Sowko .................... B24C 5/066
228/178
(Continued)

*Primary Examiner* — Philip C Tucker
*Assistant Examiner* — Brian R Slawski
(74) *Attorney, Agent, or Firm* — BACON&THOMAS, PLLC

(57) ABSTRACT

PROCESS OF MANUFACTURE OF BASALTIC ANTIABRASIVE HYBRID PLATES it's a process of manufacture of plates with basalt coating that will be applied to elements in contact with highly abrasive products for a higher resistance to abrasion wear, thus increasing useful life and as a result reducing industrial processes that stand still, with expressive increase in productivity, with applications in mining industries, steel mill, "chutes", stock houses, silos, machines and transport systems, storage and motion subject to abrasive action through contact between intake or product with motion surface and/or storage, therefore it will be composed by steel plate SAC 50 (1); special glue cement (2); steel screen (3); basalt plates (4); and screws (5) forming a basaltic coating hybrid plate which resist traction and corrosion.

6 Claims, 8 Drawing Sheets

Figure 1:
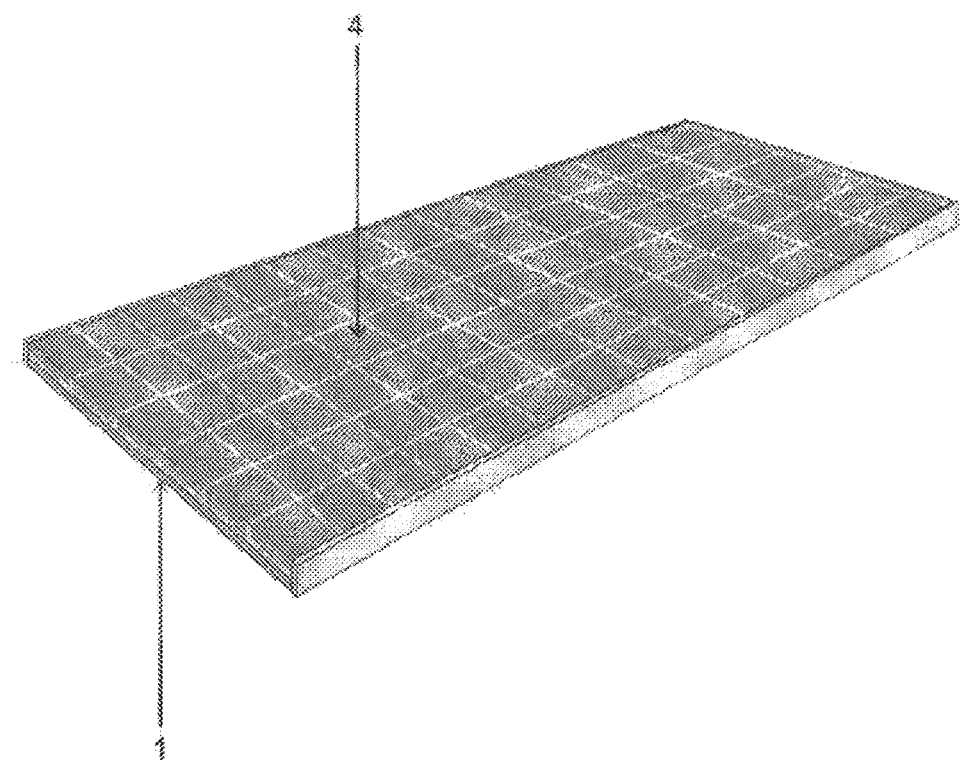

(51) Int. Cl.
 *B32B 15/02* (2006.01)
 *B32B 15/18* (2006.01)
 *E01C 5/22* (2006.01)

(52) U.S. Cl.
 CPC . *B32B 2307/3065* (2013.01); *B32B 2307/554* (2013.01); *B32B 2307/714* (2013.01); *E01C 5/22* (2013.01)

(58) Field of Classification Search
 USPC ........ 156/60, 91, 92, 196, 250, 242, 244.11, 156/278, 325; 428/81, 83, 98, 99, 102, 428/121, 122, 221, 223, 217

See application file for complete search history.

(56) References Cited

U.S. PATENT DOCUMENTS

| | | | | |
|---|---|---|---|---|
| 3,855,029 | A * | 12/1974 | Sabel | B32B 27/12 164/75 |
| 4,430,221 | A * | 2/1984 | Spiewok | B04B 7/16 209/406 |
| 5,367,007 | A * | 11/1994 | Richards | C08L 95/00 524/436 |
| 2004/0234821 | A1* | 11/2004 | Majagi | C22C 29/06 428/472 |
| 2007/0172641 | A1* | 7/2007 | Serwin | E04C 2/26 428/323 |
| 2007/0224401 | A1* | 9/2007 | Telander | B32B 3/06 428/212 |
| 2010/0326336 | A1* | 12/2010 | Struthers | B32B 13/12 109/78 |
| 2012/0128926 | A1* | 5/2012 | Ohishi | B32B 15/011 428/102 |

\* cited by examiner

PROCESS OF MANUFACTURE OF BASALTIC ANTIABRASIVE HYBRID PLATES

The current patent of invention refers to a process from manufacture of basaltic antiabrasive hybrid plates. More precisely with the use of melted basalt to the more resistence to abrasive in places that demand such efficiency in systems of transport, storage and motion of inputs/intake or abrasive products in the industry, in mining, on conveyors and freight elevators.

Many types of plates are utilized and substituted in areas subject to wear through abrasion, these plates made too by forging in steel plates or same ingots, parts that despite of apparent resistance, when installed in areas subject to abrasion suffer constant wear waste, and in one advanced phase of wear are necessarily replaced with the consequent stop of production to execution of such task.

It is known that the transport in bulk of materials in many industries, steel mills, mining companies and coal fired thermoelectrics is associated to the high wear of components. Beyond of lost in investment from original equipment, the combination from stops of factories and lost of production, destroy the base from capital of enterprise. This is not acceptable in the current markets, so competitives.

The solution of this problem is the use of protection anti-wear reliable. The choice of adequate material is from vital importance, thus as your correct application. Since was developed the molten basalt that serve to promote the reduction of waste and maintenance costs.

The existing solutions today don't utilize the concept from creation of products with application of different materials for maximum optimization and utilization of yours functional characteristics.

With the intention to continue with the utilization of basalt for coating from equipments of transport in bulk of materials in many industries and coal fired thermoelectrics, having in question your anti-wear properties, was developed the PROCESS OF MANUFACTURE OF BASALTIC ANTI ABRASIVE HYBRID PLATES that will allow through the aggregation of some materials as well as consecutive arrangement of each component, showing an increase of useful life due to high abrasion resistance, namely, the wear plate, and consequently the significant reduction or paralysations of industrial processes with a significant increase of productivity.

The great advantage too, of utilization from plates hybrid here requested is that the same allow a minimum duration to the resistance of abrasion of 5 (five years) with guarantee, being that only with this advantage the reduction of costs due the stops and paralysations is 5 times minor than the utilized in the market, having in view that today the change of plates utilized are made in intervals from maximum of 1 (one year).

The manufacturing process of basaltic antiabrasive hybrid plates will be better understood through of the detailed description in line with the following figures attached, where:

FIG. 01 Presents a view in perspective from hybrid plate of process from manufacturing of hybrid plates antiabrasives basaltics with folded edge.

Figure 2:
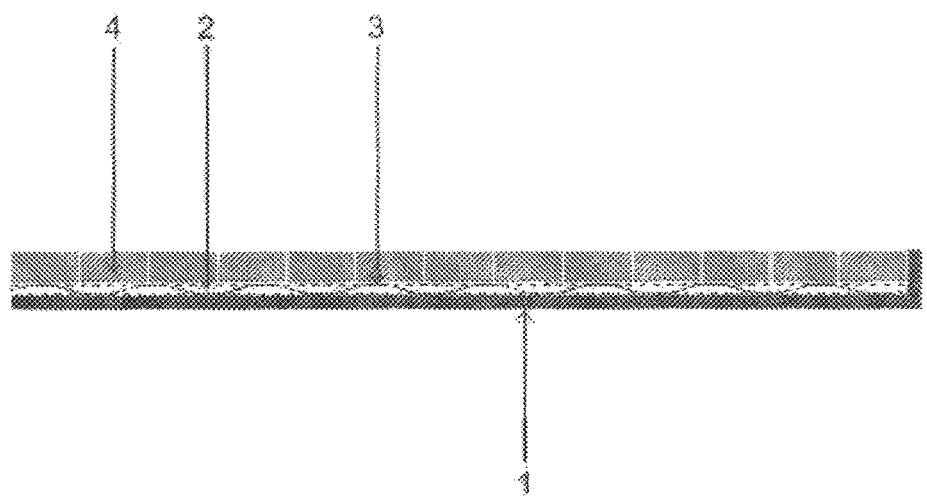

FIG. 02 Presents a side view from hybrid plate of process from manufacturing of hybrid plates antiabrasives basaltics with folded edge.

Figure 3:
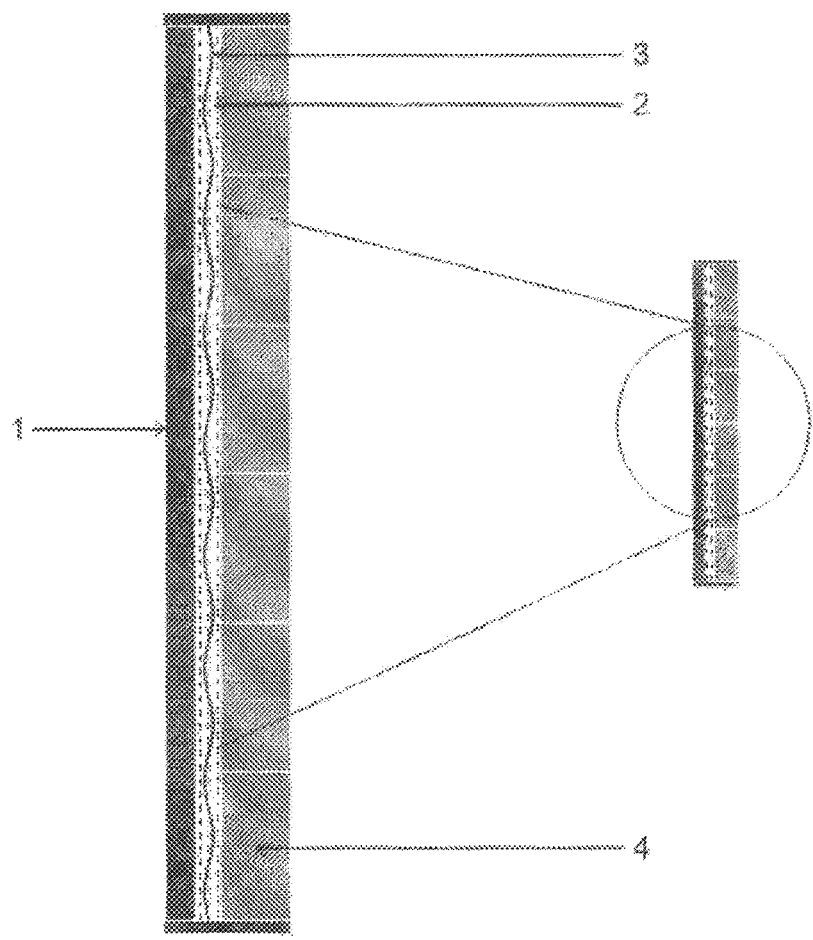

FIG. 03 Presents a front view from hybrid plate of process from manufacturing of hybrid plates antiabrasives basaltics with folded edge.

Figure 4:
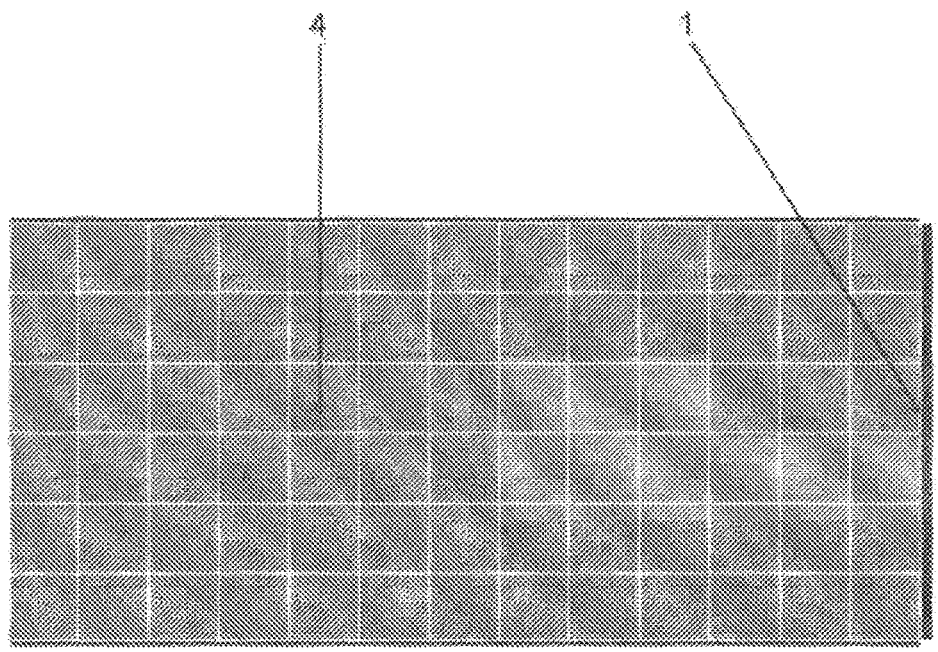

FIG. 04 Presents an upper view from hybrid plate of process from manufacturing of hybrid plates antiabrasives basaltics with folded edge.

Figure 5:
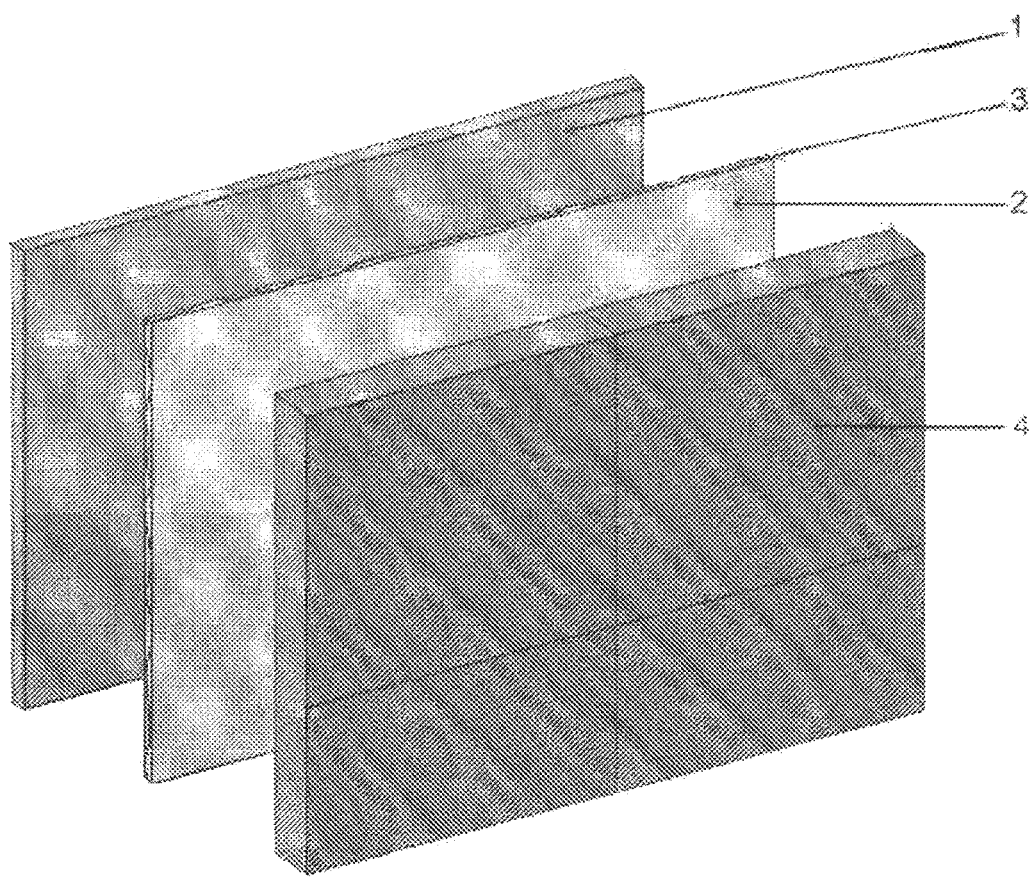

FIG. 05 Presents an exploded perspective view of process from manufacturing of hybrid plates antiabrasives basaltics with screws.

Figure 6:
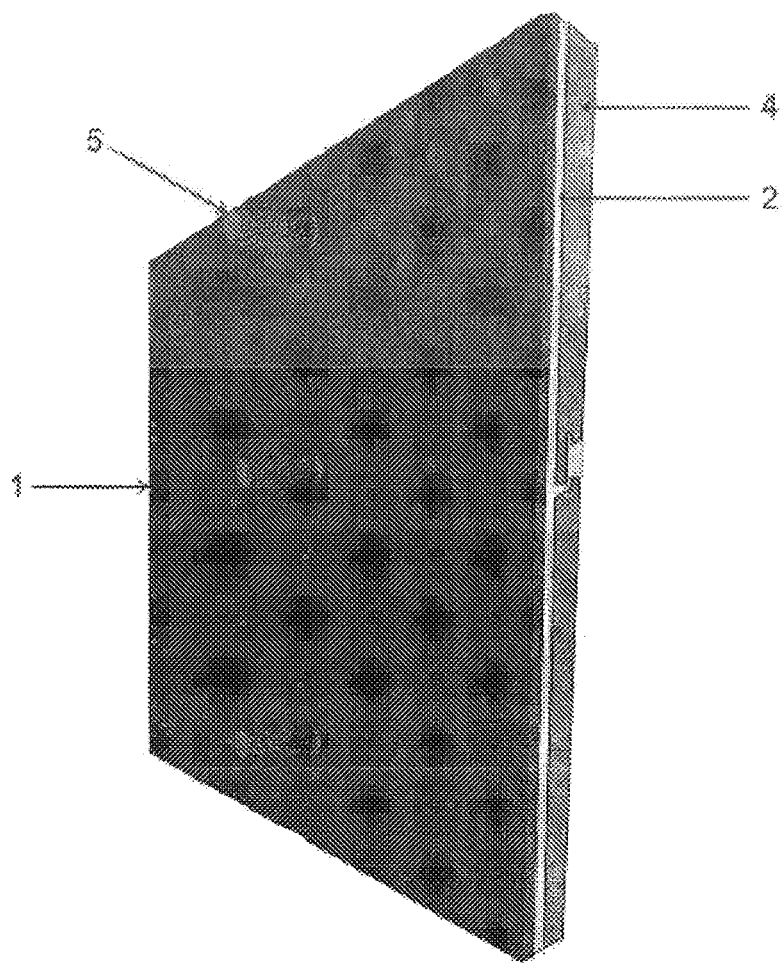

FIG. 06 Presents a view in perspective from hybrid plate of process from manufacturing of hybrid plates antiabrasives basaltics with screws.

Figure 7:
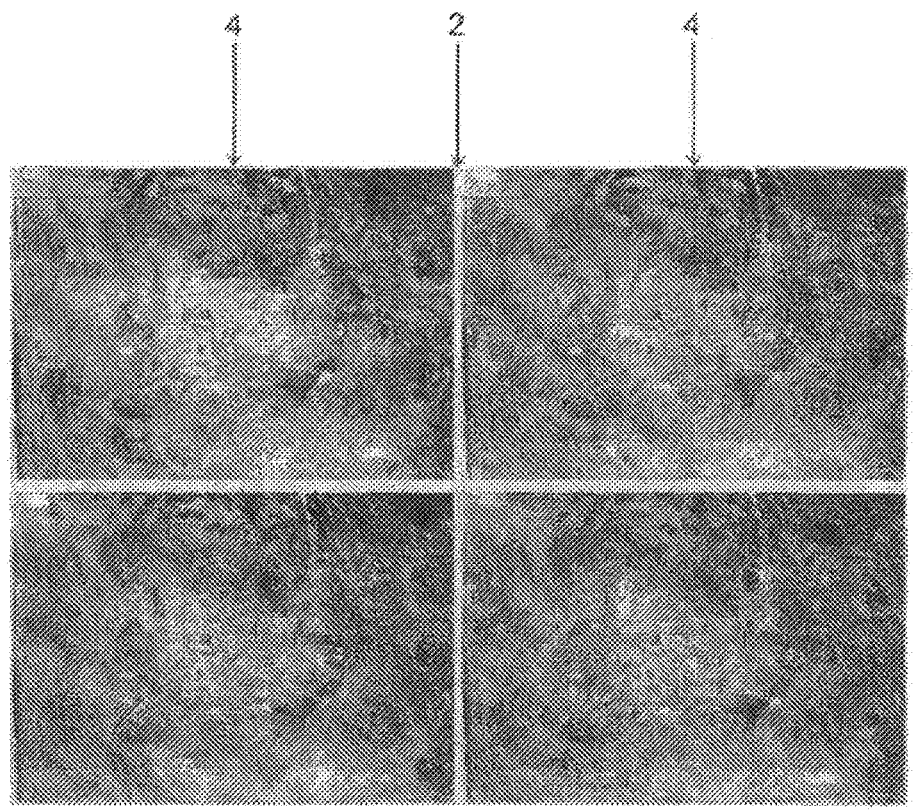

FIG. 07 Presents an upper view from hybrid plate of process from manufacturing of hybrid plates antiabrasives basaltics with screws.

Figure 8:
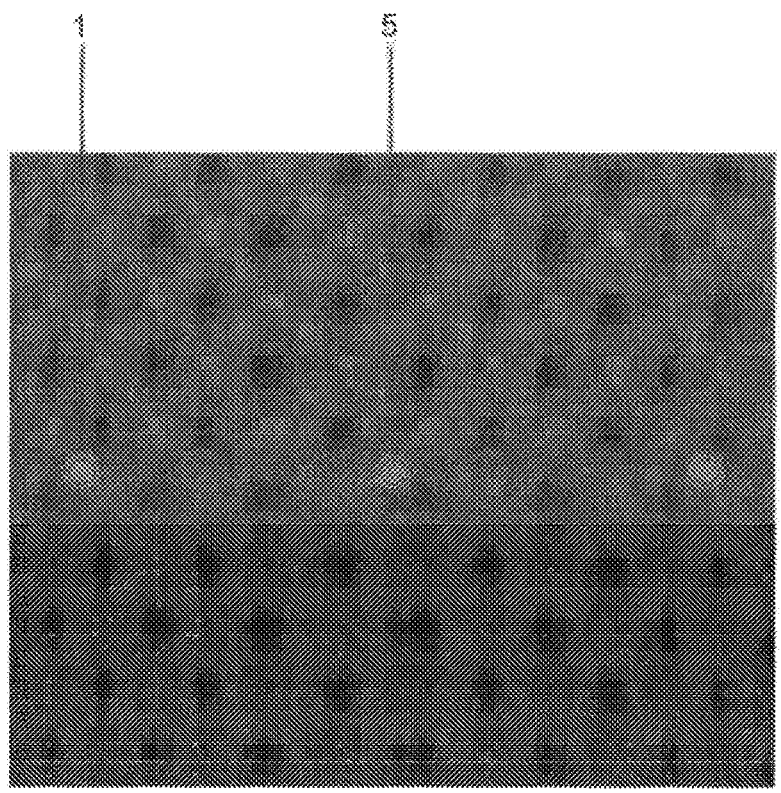

FIG. 08 Presents an upper view from hybrid plate of process from manufacturing of hybrid plates antiabrasives basaltics with screws.

Figure 9:
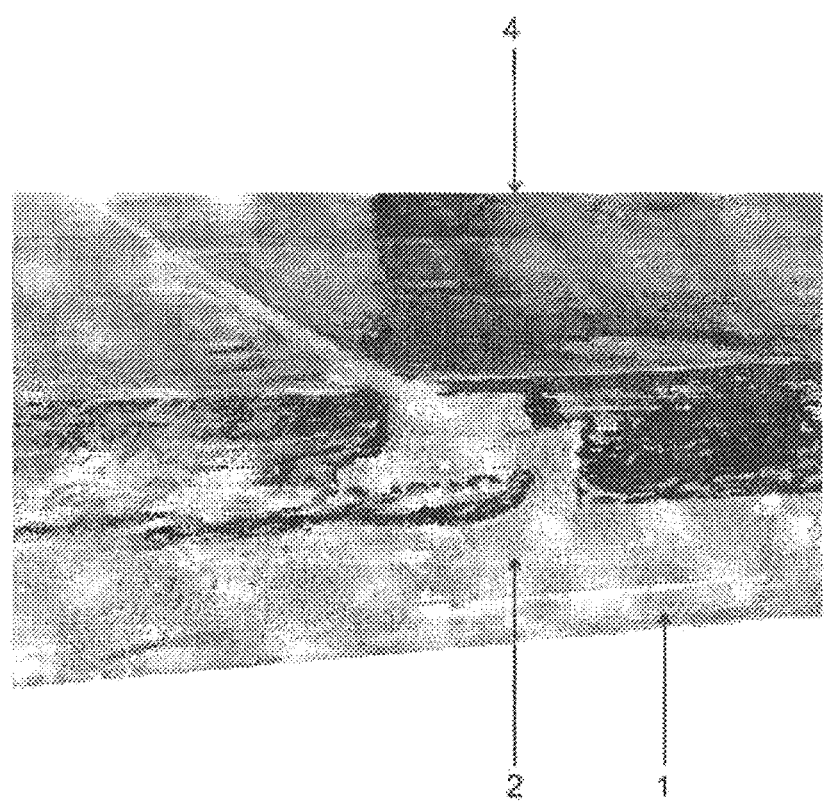

FIG. 09 Presents a view in perspective approximate from hybrid plate of process from manufacturing of hybrid plates antiabrasives basaltics with screws.

With reference to these figures can observe that the process from manufacturing of hybrid plates antiabrasives basaltics is understood as a product that will be offered to the industries of mining, steel mills and any others that have yours facilities subject to high levels of abrasion.

The basaltic plate here described refers to a hybrid plate made of steel plate SAC 50 (1) in yours diverses gauges which will be the face for support of the plate, soon will be aggregated a special glue cement (2), jointly with steel screen (3); and by end will be fixed the basaltic plates (4) comprising thus the other face of plate for abrasion resistance.

The steel plate SAC 50 (1) will may consist in screws (5). DIN standard in the diverses gauges, allowing that the hybrid plates fix in the surfaces that will be implanted. Or too, which still allow the not utilization of screws (5); being fixed through Anchorage.

The special glue cement (2) comprises in a mixture that will involve the steel screen (3) in such way that this set will allow the property from shock absorber of impact thus as to unite the steel plate SAC 50 (1) to the basaltic plates (4). Such as, being a mixture that will result in an alloy, it will allow still the functionality of flexibility, compression and compressibility.

Such hybrid plates still will may receive galvanizing treatment, aiming to ensure still more the protection against the rust.

CHARACTERISTICS OF MEANS

Basalt: Physical Characteristics of Molten Basalt

| Category | Property |
| --- | --- |
| Density | 3 g/cm$^3$ |
| Compressive resistance | 300 MPa |
| Bending resistance | ≥60 MPa |
| Impact resistance | 1.76 KJ/m$^2$ |
| Abrasion resistance | 0.07 g/cm$^2$ |
| Vickers hardness scale | ≥720 kg/mm$^2$ |
| Modulus of elasticity | 1.67 × 10 MPa |
| Coefficient of expansion | 8.92 × 10$^{-6}$ |
| Chemical attack resistance | |
| 95%-98% H2SO4 | ≥98% |
| 20% H2SO4 | ≥94% |
| 20% NaOH | ≥98% |

CHARACTERISTICS OF STEEL SAC 50

General Characteristics of Thick Plates

| Current generation | Previous generation | Flow limit (MPa) | Resistance to atmospheric corrosion | Fire resistance |
|---|---|---|---|---|
| USI-CIVIL-300 | ASTM-A36MGM | λ Min 300 | λ | λ |
| USI-CIVIL-350 | ASTM-A572-50-1 | v Min 350 | λ | λ |
| USI-SAC-300 | USI-SAC-41-MG | σ Min 300 | v | λ |
| USI-SAC-350 | USI-SAC-50 | v Min 350 | v | λ |
| USI-FIRE-350 | USI-FIRE-490 | v Min 325 (Room Temperature) Min 217 (600° C.) | v | v |

*Legends:
λ - low,
σ - médium,
v - high

Similarity to the Thick Plates

| Quality | ASTM | Similar Rules EM | JIS | NBR | Mercosul |
|---|---|---|---|---|---|
| USI-CIVIL-300 | ASTM-A-36 | 10025-S235J0 | G3101-SS400 | 6650-CF26 | 02-131-ED24 |
| USI-CIVIL-350 | ASTM-A572-50-1 | 10025-S355J0 | G3101-SS490 | 5000 5004 | 02-102-MCF-345 02-101-MCG-360 |
| USI- SAC-41 | A709W-GR36 | 10155-S235J0 | G3114-SMA400 | 5921-CFR-400 5008-CGR-400 | 02-103-GRAU-400 |
| USI- SAC-41MG | A709W-GR50 | — | — | 5921-CFR-400 5008-CGR-400 | NM-140-98-GRAU-400 |
| USI- SAC-50 | A588 (CG) A606-2 (TQ) | 10155-S355J0W | G3114-SMA490 | 5921-CFR-500 5008-CGR-500 | NM-140-98-GRAU-500 |
| USI- SAC-350 | A242-1 (CG) A606-4 (TQ) | 10155-S355J0WP | G3125-SPA-H | — | — |

Characterization of Steels Regarding Their Chemical Systems

| Application | Nomenclature | DU Chemical system |
|---|---|---|
| Structural | ASTM-A-36-MG | C e Mn |
|  | ASTM-A-36 |  |
|  | ASTM-A-572-50-1 |  |
|  | USI-CIVIL-300 |  |
|  | USI-CIVIL-350 |  |
| Corrosion resistance | USI-SAC-300 USI-SAC-350 | Si, P, Cu e Cr |
| Fire resistance | USI-FIRE-300, USI-FIRE-350 | Mo e Cu |

Specified Chemical Compound (% in Mass)—Thick Plates

| Steel | Thickness | C | Mn | Si | P | S | Nb |
|---|---|---|---|---|---|---|---|
| ASTM-A36-MG | 6.0 to 75.00 | 0.26 | 0.80 to 1.35 | 0.15 to 0.30 | 0.04 | 0.05 | — |
| ASTM-A36 | 6.0 to 19.1 | 0.25 | — | 0.4 max | | | |
| | 19.1 to 38.1 | 0.26 | 0.80 to 1.20 | 0.15 to 0.4 | | | |
| | 38.1 to 63.5 | 0.27 | | | | | |
| | 63.5 to 101.6 | | | | | | |
| ASTM-A572-50-1 | until 9.53 | 0.23 | 0.50 to 1.35 | 0.4 max. | | | 0.005 to 0.050 |
| | 9.53 to 38.10 | 0.2 | | | | | |
| | 38.1 to 50.00 | — | 0.80 to 1.50 | 0.15 to 0.40 | | | |

Specified Mechanical Properties

| Steel | Traction (cross) | | | | | Bending (1) | |
|---|---|---|---|---|---|---|---|
| | | | Lengthening (2) | | | (Longitudinal) | |
| | LE (MPa) | LR (MPa) | Thickness (min) | BM (min) | % (min) | Thickness (mm) | Diameter |
| ASTM-A36-MG | Min 300 | Min | 6.00 to 75.00 | 50 200 | 18 0.18 | Below 19.05<br>19.05 to 25.40<br>25.40 to 38.10<br>38.10 to 50.80<br>Above 50.80 | 0.5E<br>1.0E<br>1.5E<br>2.5E<br>3.0E |
| ASTM-A36 | Min 250 | 400 to 550 | 6.00 to 70.00<br><br>70.00 to 101.6 | 200<br><br>50 | 20<br><br>23 | Below 19.05<br>19.05 to 25.40<br>25.40 to 38.10<br>38.10 to 50.80<br>Above 50.80 | 0.5E<br>1.0E<br>1.5E<br>2.5E<br>3.0E |
| ASTM-A572-50-1 | Min 345 | Min 450 | <50.00 | 200 | 16 | Below 19.05<br>19.05 to 25.40<br>25.40 to 38.10 | 1.0E<br>1.5E<br>2.5E |

1 - Carried out when requested by the client.
2 - The lengthening values must be reduced according to the following table;

Quality for General Uses

| Specification (SAE) | Thickness range (mm) | Chemical Compound (%) | | | | |
|---|---|---|---|---|---|---|
| | | C (max) | Mn (max.) | Si (max.) | P (max.) | S (max.) |
| 1010 | 5.0 < e ≤ 152.4 | 0.08-0.13 | 0.30-0.60 | 0.35 | 0.04 | 0.05 |
| 1020 | | 0.17-0.23 | | | | |
| 1045 | | 0.42-0.50 | 0.60-0.90 | 0.10-0.35 | | |

Equipment Needed for Manufacturing:
  Plasma cutting equipment for steel and screen plates;
  Equipment for welding type mig;
  Bend equipment for steel plate;
  Special tables for cutting the molten Basalt;
  Press for casting steel and basalt plates.

Stage of Productive Process:
  Basalt casting in order to prepare the pieces: in this stage, the cutting, the shape cutting, the mounting teeth and the cast basalt plates finishing is carried out, according to the dimensions of the steel plate to be coated;
  Electrolytic galvanizing of the steel plates: galvanizing of plates on specified measurements (when plates are subjected to humidity conditions and/or environmental corrosion);
  Doubling of plates: the plate bend in its greater dimension is carried out forming a cross section in L;
  Cutting: plasma cutting and punching of steel plates USI SAC 350 (old SAC 50) is carried out;
  Cutting on steel screen: cutting on screen in galvanized steel 14 is carried out and it will be scaled on glue cement between the steel plate and the basalt coating;
  Preparation of a special glue cement: a proportioning plaster with a mixture of special cement ARI(high initial resistance) is done+grit+crushed basalt;
  Plates casting using hydraulic press: the application of the basalt pieces on the plates, is done mounted among themselves and stuck with a special glue cement;
  Painting, finishing and codification of the end product: it is carried out the procedure for final surfacing, serial number with barcode for identifying lot number and date of manufacturing.

Components and characteristics of the products (steel, electrolytic galvanizing, screen, cast basalt, special cement, screws, welding, cuttings): Type of products.
  Standard plates;
  Hybrid plates;
  Formed plates;
  Ducts Coating;
  Customized plates.

Benefits Identified with the Use from Process of Manufacture in Basaltic Antiabrasive Hybrid Plates:
  Increase of useful life;
  Operation without maintenance;
  Operation without interruption;
  Eliminates production losses;
  There is no contamination of the product resulting from abrasion, mixture or corrosion;
  Physiologically harmless, because this is indicated to the food industry;
  Smooth contact área, that promotes good fluidity and avoiding accumultation of material;
  Reduce the pression loss and, consequently decrease the energy consumption.

Afterwards, it Will be Indicated Some Areas where can be Applied the Process:
  Cement plants;
  Breweries, malt houses;
  Chemical industries;
  Gas plants;
  Foundries;
  Glass plants;
  Steel mills and rolling mills;
  Lime plants, sand and potassium;
  Mineral extraction and coal;
  Coke plants;
  Mills and incineration plants and residual recycling;
  Paper plants.

In this process, we have observed that only in the restriction of temperature in the operational environment must not exceed 350 degrees Celsius and the limitation of straight impacts and sharp charges act directly on the plates surfasse, this is the only disadvantage of the material due to its crystalline structure.

As it was shown above, the preferential embodiments given to the measurement of hybrid plates, concerning thickness, shapes, and bends on steel plates, so that the application process for transport equipment coating described here are a feasible alternative. All references to antiabrasive hybrid plates, shall not limit the current invention; it may have constructive variants equivalent, but it cannot escape from scope of protection of the invention.

The invention claimed is:

1. A process for manufacturing a basaltic antiabrasive hybrid plate, comprising steps of:
   providing a steel plate to form a first layer of the hybrid plate;
   providing a cast basalt plate for abrasion resistance;
   joining the cast basalt plate to the steel plate by a glue cement layer that contains a steel screen and that provides shock absorbing properties to protect the hybrid plate from impacts.

2. The process for manufacturing a basaltic antiabrasive hybrid plate as claimed in claim 1, further comprising the step of fixing screws to the steel plate so the screws extend from the steel plate in order to secure the steel plate to equipment.

3. The process for manufacturing a basaltic antiabrasive hybrid plate as claimed in claim 1, wherein the step of joining the cast basalt plate to the steel plate is carried out by using a hydraulic press to press the cast basalt plate against the steel plate with the glue cement layer in between.

4. The process for manufacturing a basaltic antiabrasive hybrid plate as claimed in claim 1, wherein the glue cement layer includes crushed basalt.

5. The process for manufacturing a basaltic antiabrasive hybrid plate as claimed in claim 1, further comprising the step of electrolytic galvanizing the steel plate.

6. The process for manufacturing a basaltic antiabrasive hybrid plate as claimed in claim 1, wherein the step of providing the steel plate includes the step of bending the steel plate to have an L-shaped cross-section.

* * * * *